United States Patent
Anderson et al.

(10) Patent No.: US 12,004,510 B2
(45) Date of Patent: Jun. 11, 2024

(54) PEST-RESISTANT IRRIGATION TUBE

(71) Applicant: Dow Global Technologies LLC, Midland, MI (US)

(72) Inventors: Rachel C. Anderson, Midland, MI (US); Mohamed Esseghir, Collegeville, PA (US); Mark T. Jablonka, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 806 days.

(21) Appl. No.: 17/257,700

(22) PCT Filed: Jun. 27, 2019

(86) PCT No.: PCT/US2019/039506
§ 371 (c)(1),
(2) Date: Jan. 4, 2021

(87) PCT Pub. No.: WO2020/013998
PCT Pub. Date: Jan. 16, 2020

(65) Prior Publication Data
US 2021/0289774 A1 Sep. 23, 2021

Related U.S. Application Data

(60) Provisional application No. 62/696,637, filed on Jul. 11, 2018.

(51) Int. Cl.
*A01G 25/02* (2006.01)
*A01M 29/12* (2011.01)
(Continued)

(52) U.S. Cl.
CPC ............. *A01N 25/10* (2013.01); *A01G 25/02* (2013.01); *A01M 29/12* (2013.01); *A01N 25/34* (2013.01); *A01N 37/18* (2013.01); *A01N 37/44* (2013.01)

(58) Field of Classification Search
CPC ....... A01G 25/02; A01G 25/023; F16L 57/00; A01N 53/00; A01N 25/10; A01N 25/34
(Continued)

(56) References Cited

U.S. PATENT DOCUMENTS 4,171,463 A * 10/1979 Watkins .................. H01B 7/28
174/136
6,886,761 B2   5/2005 Cohen
(Continued)

FOREIGN PATENT DOCUMENTS

CN         1357702 A     7/2002
CN       102115596 A     7/2011
(Continued)

OTHER PUBLICATIONS

Rodrepel—Non-Hazardous Bird and Animal Repellant Company Brochure, Oct. 23, 2016, pp. 1-6.
(Continued)

*Primary Examiner* — Patrick F Brinson
(74) *Attorney, Agent, or Firm* — Boyle Fredrickson, S.C.

(57) ABSTRACT

The present disclosure provides a composition. In an embodiment, the composition includes a pest repellent, a barrier polymer, and an ethylene-based polymer. The barrier polymer has a melt temperature, Tm, from 175° C. to less than 270° C. The barrier polymer is selected from the group consisting of one or more polyamides, one or more polyesters, and combinations thereof. Also disclosed is an irrigation tube having an annular wall. The annular wall is composed of the present composition.

11 Claims, 4 Drawing Sheets

(51) Int. Cl.
*A01N 25/10* (2006.01)
*A01N 25/34* (2006.01)
*A01N 37/18* (2006.01)
*A01N 37/44* (2006.01)

(58) Field of Classification Search
USPC ......... 138/177, 131, 140; 239/542, 562, 566
See application file for complete search history.

(56) References Cited

U.S. PATENT DOCUMENTS

| | | | |
|---|---|---|---|
| 7,287,489 | B1 * | 10/2007 | O'Brien ................ A01M 29/12 |
| | | | 119/712 |
| 10,969,054 | B1 * | 4/2021 | Bender .................. F16L 57/00 |
| 2016/0330918 | A1 | 11/2016 | Ruskin et al. |
| 2017/0035044 | A1 | 2/2017 | Ruskin |
| 2020/0305364 | A1 * | 10/2020 | Katzir .................. B29C 48/903 |
| 2020/0353724 | A1 * | 11/2020 | Vestergaard Frandsen ................ |
| | | | B31B 70/79 |

FOREIGN PATENT DOCUMENTS

| | | |
|---|---|---|
| CN | 1885080 A | 1/2012 |
| CN | 102321284 A | 1/2012 |
| CN | 103319772 A | 9/2013 |
| CN | 1033725505 A | 10/2013 |
| CN | 104041381 A | 9/2014 |
| CN | 104262739 A | 1/2015 |
| CN | 204377591 U | 6/2015 |
| CN | 105062036 A | 11/2015 |
| CN | 107629302 A | 1/2018 |
| WO | 2009/090654 A2 | 7/2009 |
| WO | 2016/065497 A1 | 5/2016 |
| WO | 2017/027269 A1 | 2/2017 |
| WO | 2019/013976 A1 | 1/2019 |

OTHER PUBLICATIONS

Ahmad Nalbandi et al, "An Investigation Into the Physical Properties of Polyethylene Gas Pipes by the Incorporation of Anti-Rodent Masterbatches", Journal of Petroleum, May 2013, vol. 3 Issue 1, Research Institute of Petroleum Industry.

* cited by examiner

PEST-RESISTANT IRRIGATION TUBE

BACKGROUND

Drip irrigation is a water-saving irrigation technique. Implementation of drip irrigation entails laying of irrigation tube onto farmland, gardens, and the like. An irrigation tube is an annular structure (i.e., a tube) through which water, or another liquid, may pass. An irrigation tube typically has spaced-apart perforations (often in the form of emitters) extending along the tube length. The water is discharged through the perforations along the length of the irrigation tube. An irrigation tube accurately supplies water and nutrients to crops. Irrigation tube is advantageous as it saves water, saves fertilizer, saves labor and improves the quality and output of crops.

Irrigation tube laid on farmland, however, is prone to damage by rodents and other pests. Irrigation tube gnawed, bitten, scratched, or otherwise mangled by miscreants such as rats, voles, moles, badgers, rabbits, squirrels, shrews, wolverines, and/or mice, for example, loses its effectiveness and is difficult to maintain. Irrigation tube damaged by such rodents and pests results in loss of crops causing significant harm to farmers.

Known is the deterrence of rodent attack with incorporation of a pest repellent into the polymeric material from which the irrigation tube is made (typically polyethylene). Shortcomings in conventional pest repellent/polymeric approaches include rapid leaching of the pest repellent from the irrigation tube. Addition of pest repellent into polymeric material also diminishes mechanical properties such as tensile strength and crack resistance, which are essential in irrigation tube applications.

The art recognizes the need for polymeric compositions effective in deterring pest and rodent attack while simultaneously maintaining processability and suitable mechanical properties for use in irrigation tube.

SUMMARY

The present disclosure provides a composition. In an embodiment, the composition includes a pest repellent, a barrier polymer, and an ethylene-based polymer. The barrier polymer has a melt temperature, Tm, from 175° C. to less than 270° C. The barrier polymer is selected from the group consisting of one or more polyamides, one or more polyesters, and combinations thereof.

The present disclosure provides an irrigation tube having an annular wall formed from a composition. The composition includes a pest repellent, a barrier polymer, and an ethylene-based polymer. The barrier polymer has a melt temperature, Tm, from 175° C. to less than 270° C. The barrier polymer is selected from the group consisting of one or more polyamides, one or more polyesters, and combinations thereof.

The present disclosure provides a multilayer irrigation tube. The multilayer irrigation tube includes an annular wall having (i) an outer layer comprising a blend of a pest repellent and an ethylene-based polymer. The annular wall includes (ii) an intermediate layer comprising a compatibilizing polymer selected from the group consisting of a maleated polyolefin, an acrylate-based polymer, a maleated acrylate-based polymer, a zinc ionomer, an acid copolymer, an ethylene vinyl acetate polymer, and combinations thereof. The annular wall includes (iii) an inner layer comprising a barrier polymer having a melt temperature, Tm, from 175° C. to less than 270° C., the barrier polymer selected from the group consisting of one or more polyamides, one or more polyesters, and combinations thereof.

BRIEF DESCRIPTION OF THE DRAWINGS

FIG. 3A shows the concentration of denatonium benzoate in solution over time. FIG. 3B shows the concentration of lidocaine, a degradation product of denatonium benzoate, over time. Error bars: sample standard deviation (n=6).

DEFINITIONS

Figure 1A:
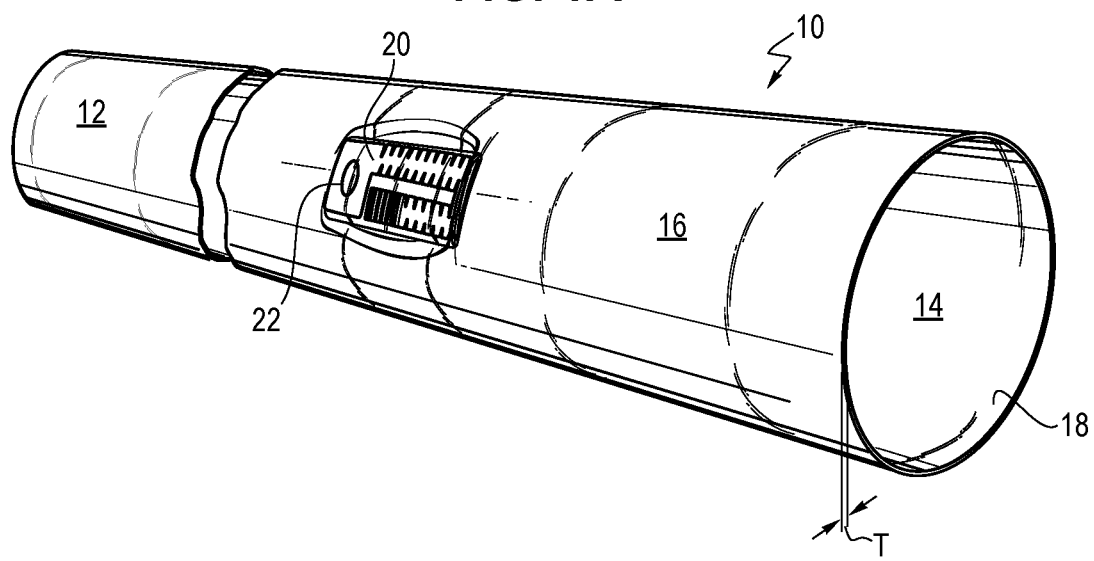
FIG. 1A is a perspective view of an irrigation tube in accordance with an embodiment of the present disclosure.

Any reference to the Periodic Table of Elements is that as published by CRC Press, Inc., 1990-1991. Reference to a group of elements in this table is by the new notation for numbering groups.

For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges disclosed herein include all values from, and including, the lower and upper value. For ranges containing explicit values (e.g., 1 or 2, or 3 to 5, or 6, or 7), any subrange between any two explicit values is included (e.g., the range 1-7 above includes subranges 1 to 2; 2 to 6; 5 to 7; 3 to 7; 5 to 6; etc.).

Unless stated to the contrary, implicit from the context, or customary in the art, all parts and percents are based on weight and all test methods are current as of the filing date of this disclosure.

The terms "blend" or "polymer blend," as used herein, is a blend of two or more polymers. Such a blend may or may not be miscible (not phase separated at molecular level). Such a blend may or may not be phase separated. Such a blend may or may not contain one or more domain configurations, as determined from transmission electron spectroscopy, light scattering, x-ray scattering, and other methods known in the art.

The term "composition" refers to a mixture of materials which comprise the composition, as well as reaction products and decomposition products formed from the materials of the composition.

The terms "comprising," "including," "having" and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

An "ethylene-based polymer" is a polymer that contains more than 50 weight percent (wt %) polymerized ethylene monomer (based on the total amount of polymerizable monomers) and, optionally, may contain at least one comonomer. Ethylene-based polymer includes ethylene homopolymer, and ethylene copolymer (meaning units derived from ethylene and one or more comonomers). The terms "ethylene-based polymer" and "polyethylene" may be used interchangeably. Nonlimiting examples of ethylene-based polymer (polyethylene) include low density polyethylene (LDPE) and linear polyethylene. Nonlimiting examples of linear polyethylene include linear low density polyethylene (LLDPE), ultra low density polyethylene (ULDPE), very low density polyethylene (VLDPE), multi-component ethylene-based copolymer (EPE), ethylene/α-olefin multi-block copolymers (also known as olefin block copolymer (OBC)), substantially linear, or linear, plastomers/elastomers, and high density polyethylene (HDPE). Generally, polyethylene may be produced in gas-phase, fluidized bed reactors, liquid phase slurry process reactors, or liquid phase solution process reactors, using a heterogeneous catalyst system, such as Ziegler-Natta catalyst, a homogeneous catalyst system, comprising Group 4 transition metals and ligand structures such as metallocene, non-metallocene metal-centered, heteroaryl, heterovalent aryloxyether, phosphinimine, and others. Combinations of heterogeneous and/or homogeneous catalysts also may be used in either single reactor or dual reactor configurations.

"Facial surface," "planar surface" and like terms refer to the flat surfaces of the layers that are in contact with the opposite and adjacent surfaces of the adjoining layers. Facial surfaces are distinct from edge surfaces. A rectangular layer comprises two facial surfaces and four edge surfaces. A circular layer comprises two facial surfaces and one continuous edge surface.

"High density polyethylene" (or "HDPE") is an ethylene homopolymer or an ethylene/α-olefin copolymer with at least one $C_4$-$C_{10}$ α-olefin comonomer, or $C_4$-$C_8$ α-olefin comonomer and a density from 0.940 g/cc, or 0.945 g/cc, or 0.950 g/cc, 0.953 g/cc to 0.955 g/cc, or 0.960 g/cc, or 0.965 g/cc, or 0.970 g/cc, or 0.975 g/cc, or 0.980 g/cc. The HDPE can be a monomodal copolymer or a multimodal copolymer. A "monomodal ethylene copolymer" is an ethylene/$C_4$-$C_{10}$ α-olefin copolymer that has one distinct peak in a gel permeation chromatography (GPC) showing the molecular weight distribution. A "multimodal ethylene copolymer" is an ethylene/$C_4$-$C_{10}$ α-olefin copolymer that has at least two distinct peaks in a GPC showing the molecular weight distribution. Multimodal includes copolymer having two peaks (bimodal) as well as copolymer having more than two peaks. Nonlimiting examples of HDPE include DOW™ High Density Polyethylene (HDPE) Resins (available from The Dow Chemical Company), CONTINUUM™ Bimodal Polyethylene Resins (available from The Dow Chemical Company), LUPOLEN™ (available from LyondellBasell), as well as HDPE products from *Borealis*, Ineos, and ExxonMobil.

"Low density polyethylene" (or "LDPE") consists of ethylene homopolymer, or ethylene/α-olefin copolymer comprising at least one $C_3$-$C_{10}$ α-olefin that has a density from 0.915 g/cc to less than 0.940 g/cc and contains long chain branching with broad MWD. LDPE is typically produced by way of high pressure free radical polymerization (tubular reactor or autoclave with free radical initiator). Nonlimiting examples of LDPE include MarFlex™ (Chevron Phillips), LUPOLEN™ (LyondellBasell), as well as LDPE products from *Borealis*, Ineos, ExxonMobil, and others.

"Linear low density polyethylene" (or "LLDPE") is a linear ethylene/α-olefin copolymer containing heterogeneous short-chain branching distribution comprising units derived from ethylene and units derived from at least one $C_3$-$C_{10}$ α-olefin comonomer. LLDPE is characterized by little, if any, long chain branching, in contrast to conventional LDPE. LLDPE has a density from 0.910 g/cc to less than 0.940 g/cc. Nonlimiting examples of LLDPE include TUFLIN™ linear low density polyethylene resins (available from The Dow Chemical Company), DOWLEX™ polyethylene resins (available from the Dow Chemical Company), FINGERPRINT™ polyethylene resins (available from the Dow Chemical Company), and MARLEX™ polyethylene (available from Chevron Phillips).

An "olefin-based polymer" or "polyolefin" is a polymer that contains a majority amount, or greater than 50 wt %, of polymerized olefin monomer, for example, ethylene or propylene, (based on the weight of the polymer), and optionally, may contain at least one comonomer. A nonlimiting example of an olefin-based polymer is an ethylene-based polymer and propylene-based polymer.

A "polymer" is a polymeric compound prepared by polymerizing monomers, whether of the same or a different type. The generic term polymer thus embraces the term "homopolymer" (employed to refer to polymers prepared from only one type of monomer, with the understanding that trace amounts of impurities can be incorporated into the polymer structure), and the term "interpolymer." Trace amounts of impurities, for example, catalyst residues, may be incorporated into and/or within the polymer. It also embraces all forms of copolymer, e.g., random, block, etc. The terms "ethylene/α-olefin polymer" and "propylene/α-olefin polymer" are indicative of copolymer as described above prepared from polymerizing ethylene or propylene respectively and one or more additional, polymerizable α-olefin monomer. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to as being based on "units" that are the polymerized form of a corresponding monomer.

A "propylene-based polymer" is a polymer that contains more than 50 weight percent polymerized propylene monomer (based on the total amount of polymerizable monomers) and, optionally, may contain at least one comonomer. The terms "propylene-based polymer" and "polypropylene" may be used interchangeably.

"Facial surface," "planar surface" and like terms refer to the flat surfaces of the layers that are in contact with the opposite and adjacent surfaces of the adjoining layers. Facial surfaces are distinct from edge surfaces. A rectangular layer comprises two facial surfaces and four edge surfaces. A circular layer comprises two facial surfaces and one continuous edge surface.

"Pest repellent," and like terms is a substance that deters rodents, insects and/or other pests from gnawing, attacking, or settling on an object, e.g., an irrigation tube. A gustatory pest repellent is a repellent that deters or discourages a pest through taste or ingestion of the repellent, i.e., the pest dislikes the taste and/or experiences discomfort upon consuming the repellent and thus ceases to bite into the object containing the repellent. An insect repellent is a pest repellent that deters or discourages an insect (arthropods generally), from landing on, settling on and/or attacking, an object. An insect repellent usually does not require the insect to ingest the repellent to be effective. In some instances, a repellent is also a pesticide. "Free of pest repellent" and like terms mean that the material from which the exterior layer is fabricated is without or substantially without repellent content, i.e., the material contains less than (<) 0.0001 wt %, or <0.00005 wt %, or <0.00001 wt %, or <0.000001 wt %, of repellent as measured by gas or liquid chromatography or a similar analytical method. Repellent content of less than this amount is considered inconsequential to the efficacy of the invention.

"Tie layer," "adhesive layer" and like terms mean a layer that binds two layers together. In a 3-layer lamination of an exterior layer A, a tie layer B, and an inner layer C, tie layer B is positioned between and is in contact with opposing facial surfaces of layers A and C, thus joining layers A and C to one another.

"Ultra low density polyethylene" (or "ULDPE") and "very low density polyethylene" (or "VLDPE") each is a linear ethylene/α-olefin copolymer containing heterogeneous short-chain branching distribution comprising units derived from ethylene and units derived from at least one $C_3$-$C_{10}$ α-olefin comonomer. ULDPE and VLDPE each has a density from 0.885 g/cc to 0.915 g/cc. Nonlimiting examples of ULDPE and VLDPE include ATTANE™ ultra low density polyethylene resins (available from The Dow Chemical Company) and FLEXOMER™ very low density polyethylene resins (available from The Dow Chemical Company).

Test Methods

Burst pressure of an irrigation tube in megaPascal (MPa) is measured using the Hydrostatic Quick Burst system including a Tech Team Hydrostatic Burst tank (Serial Number OR1837A), an IPT Data logger V5, an Ashcroft test gauge (0 to 600 psi) s/n c009395, and an IPT Hydrostatic Computer Stations (Model 1575.0010). 18-inch (45.72 cm) long sections of fabricated tube that do not contain an emitter are cut from a fabricated roll of tube and are connected to the Quick Burst system with fittings in a horizontal position. Pressure is ramped up using water (temperature of approximately 73° F. (23° C.)) at 2 psig/sec (14 KPa/sec) until the tube bursts with visible leakage of water from the area of rupture. The average of 5 specimens per sample is reported.

Density is measured in accordance with ASTM D792, Method B. The result is reported in grams per cubic centimeter (g/cc).

Die Swell Ratio is measured according to the Boroughe method described in International Publication No. WO 2016/065497, the entire content of which is herein incorporated by reference. The extrudate swell (die swell) is evaluated by measuring strands of extrudate cut during the melt index (I2) measurement (190° C./2.16 kg). Three 2.5 cm long strands are collected and the diameters are measured with a caliber having a readability of 0.01 mm. Die swell is expressed as a swell ratio—the ratio of the diameter of the extruder strand to the diameter of the capillary die (here, 2.096 mm). The reported die swell ratio is an average of the measured strand diameters.

Differential Scanning calorimetry (DSC) can be used to measure the melting, crystallization, and glass transition behavior of a polymer over a wide range of temperature. For example, the TA Instruments Q1000 DSC, equipped with an RCS (refrigerated cooling system) and an autosampler is used to perform this analysis. During testing, a nitrogen purge gas flow of 50 ml/min is used. Each sample is melt pressed into a thin film at about 175° C.; the melted sample is then air-cooled to room temperature (about 25° C.). A 3-10 mg, 6 mm diameter specimen is extracted from the cooled polymer, weighed, placed in a light aluminum pan (ca 50 mg), and crimped shut. Analysis is then performed to determine its thermal properties.

The thermal behavior of the sample is determined by ramping the sample temperature up and down to create a heat flow versus temperature profile. First, the sample is rapidly heated to 180° C. and held isothermal for 3 minutes in order to remove its thermal history. Next, the sample is cooled to −40° C. at a 10° C./minute cooling rate and held isothermal at −40° C. for 3 minutes. The sample is then heated to 180° C. (this is the "second heat" ramp) at a 10° C./minute heating rate. The cooling and second heating curves are recorded. The cool curve is analyzed by setting baseline endpoints from the beginning of crystallization to −20° C. The heat curve is analyzed by setting baseline endpoints from −20° C. to the end of melt. The values determined are extrapolated onset of melting, Tm, and extrapolated onset of crystallization, Tc. Heat of fusion ($H_f$) (in Joules per gram), and the calculated % crystallinity for polyethylene samples using the Equation below:

% Crystallinity=(($H_f$)/292 J/g)×100

The heat of fusion ($H_f$) and the peak melting temperature are reported from the second heat curve. Peak crystallization temperature is determined from the cooling curve.

Melting point, Tm, is determined from the DSC heating curve by first drawing the baseline between the start and end of the melting transition. A tangent line is then drawn to the data on the low temperature side of the melting peak. Where this line intersects the baseline is the extrapolated onset of melting (Tm). This is as described in Bernhard Wunderlich, *The Basis of Thermal Analysis, in Thermal Characterization of Polymeric Materials* 92, 277-278 (Edith A. Turi ed., 2d ed. 1997).

Crystallization temperature, Tc, is determined from a DSC cooling curve as above except the tangent line is drawn on the high temperature side of the crystallization peak. Where this tangent intersects the baseline is the extrapolated onset of crystallization (Tc).

Glass transition temperature, Tg, is determined from the DSC heating curve where half the sample has gained the liquid heat capacity as described in Bernhard Wunderlich, The *Basis of Thermal Analysis, in Thermal Characterization of Polymeric Materials* 92, 278-279 (Edith A. Turi ed., 2d ed. 1997). Baselines are drawn from below and above the glass transition region and extrapolated through the Tg region. The temperature at which the sample heat capacity is half-way between these baselines is the Tg.

Melt index (MI) (I2) is measured in accordance with ASTM D1238 (190° C./2.16 kg) with results reported in grams per 10 minutes (g/10 min) or decigrams per minute (dg/min).

Strain at break is measured in accordance with ASTM D638 with results reported in percent (%).

Tensile stress at yield of the high density polyethylene composition in MPa is measured using samples prepared by compression molding pellets according to ASTM D638 (2 inch/min crosshead speed)(5.08 cm/min crosshead speed).

Tensile stress at yield of the irrigation tube in MPa and tensile load at yield in Newtons (N) are measured in the machine direction (MD) on sections of fabricated microirrigation drip tube (without an emitter in the gage length) tested at 2 inch/min crosshead speed (5.08 cm/min crosshead speed). The test is performed in accordance with ASTM D638, except for aspects pertaining to sample geometry and gage length. Here, samples of at least 4 inch (10.16 cm) in length are cut from fabricated rolls of tube to allow a gage length of 1 inch (2.54 cm).

Young's Modulus is measured in accordance with ASTM D638 with results reported in megaPascals (MPa).

DETAILED DESCRIPTION

The present disclosure provides a composition. In an embodiment, the composition includes a pest repellent, a barrier polymer, and an ethylene-based polymer. The barrier polymer has a melt temperature, Tm, from 175° C. to less than 270° C., and the barrier polymer is selected from the group consisting of one or more polyamides, one or more polyesters, and combinations thereof.

1. Pest Repellent

The present composition includes a pest repellent. The pest repellent can be any substance that deters or discourages a pest from approaching, settling on, and/or attacking, e.g., biting, the composition and/or irrigation tube. The "pest" is a rodent, an insect, any combinations thereof. Nonlimiting examples of rodents intended to be deterred by the present composition include mice, rats, squirrels, chipmunks, prairie dogs, rabbits, hares, raccoons, porcupines, beavers, badgers, wolverines, moles, and voles. The repellent can be a gustatory pest repellent or a non-gustatory pest repellent.

In an embodiment, the pest repellent is a gustatory pest repellent. Nonlimiting examples of suitable gustatory pest repellent include capsaicinoids; denatonium salts, e.g., denatonium benzoate, denatonium saccharide; cycloheximide; piperine; menthol; camphor; salicylate esters; tributyl tin compounds; *eucalyptus* oil; allicin; mint oil; wintergreen; plant products such as garlic, onion, ginger, wasabi extracts, etc.; terpenoids; creosote oil; citronella; methyl anthranate; tetramethyl thiuram disulfide; and zinc dimethyl dithiocarbamates. Commercially available gustatory repellents include, but are not limited to, REPELA™ (i.e. masterbatch of denatonium benzoate in EVA available from Aversion Technologies), and BITREX™ denatonium benzoate available from Johnson Matthey.

In an embodiment, the gustatory pest repellent is present in an amount from 0.005 wt %, or 0.01 wt %, or 0.025 wt %, or 0.5 wt % to 0.75 wt %, or 1.0 wt %, or 2.0 wt %, or 2.5 wt %, based on the total weight of the composition.

In an embodiment, the gustatory pest repellent is a denatonium salt present in an amount from 0.005 wt %, or 0.01 wt % to 1.0 wt %, or 2.5 wt %, of the composition, based on total weight of the composition.

In an embodiment, the pest repellent is a non-gustatory pest repellent. Nonlimiting examples of suitable non-gustatory pest repellent include insect repellents, and these include, but are not limited to, synthetic pyrethroids; neonicotinoids; silafluofen; carbamates; metal naphthanates, e.g., copper naphthenate; phosphorous-based compounds, e.g., phoxim, chlorpyrifos, etc.; and chlorinated compounds, e.g., aldrin, chlordane, etc.

In an embodiment, the non-gustatory pest repellent is present in an amount from 0.005 wt %, or 0.01 wt %, or 0.025 wt %, or 0.5 wt % to 0.75 wt %, or 1.0 wt %, or 2.0 wt %, or 2.5 wt %, based on the weight of the composition.

2. Barrier Polymer

The present composition includes a barrier polymer. The barrier polymer is selected from one or more polyamides, one or more polyesters, and any combination or blends thereof. The barrier polymer has a melt temperature, Tm, from 175° C. to less than 270° C. The barrier polymer imparts hardness to the composition and an anti-chew feature to the composition. The barrier polymer is a polyamide, a polyester, a copolyester, an amorphous copolyester, and combinations thereof. In an embodiment, the barrier polymer is polyamide, a polyester or copolyester or amorphous copolyester, or a blend thereof and the barrier polymer has a melt temperature, Tm, from 175° C. to less than 230° C.

In an embodiment, the barrier polymer is a polyamide having a Tm, 175° C. to less than 270° C., or a polyamide having a Tm from 175° C. to less than 230° C. A "polyamide," as used herein is a polymer in which one or more amide linkages of Structure (1) occur along the molecular chain; Structure (1) provided below.

Structure (1)

Nonlimiting examples of suitable polyamide with Tm from 175° C. to less than 230° C. include Nylon 6, Nylon 66, Nylon 11, or Nylon 12, and any combination thereof.

In an embodiment, the barrier polymer is a polyester having a Tm from 175° C. to less than 270° C. A "polyester," as used herein, is a polymer in which one or more carboxylate linkages of Structure (2) occur along the molecular chain; Structure (2) provided below.

Structure (2)

Polyesters include both the products of the polycondensation of dicarboxylic acids with dihydroxy alcohols, and such products prepared with optional additional monomers, e.g., diamines, diisocyanates, etc., these latter products also known as copolyesters.

Nonlimiting examples of suitable polyester with Tm from 175° C. to less than 270° C. include polyethylene terephthalate (PET), polybutylene terephthalate (PBT), polytrimethylene terephthalate, and polyethylene napthalate, as well as their semi-crystalline and amorphous copolymers (such as amorphous copolyester, for example), PETG, and any combination thereof.

In an embodiment, the polyester has one or more end caps suitable to provide hydrolytic stability, which is desirable in irrigation tube application. Nonlimiting example of polyester with end cap is provided in U.S. Pat. No. 6,498,212, incorporated herein by reference.

In an embodiment, the polyester has Structure 2A or Structure 2B as shown below.

Structure 2A and Structure 2B (shown directly below Structure 2A).

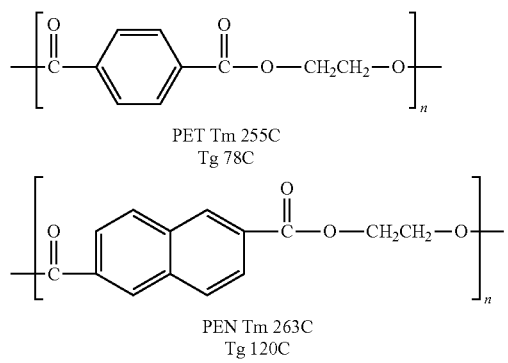

PET Tm 255C
Tg 78C

PEN Tm 263C
Tg 120C

In an embodiment, the barrier polymer is a blend of two or more polyesters. Blending two or more polyesters can produce a barrier polymer with a Tm from 175° C. to less than 230° C. In a further embodiment, the barrier polymer is a blend of two or more polyesters and the polyester blend has a Tm from 175° C. to less than 230° C.

3. Ethylene-Based Polymer

The present composition includes an ethylene-based polymer. The ethylene-based polymer can be an ethylene homopolymer or an ethylene/α-olefin copolymer. In an embodiment, the ethylene-based polymer is an ethylene/$C_3$-$C_{12}$ α-olefin copolymer. Nonlimiting examples of ethylene/$C_3$-$C_{12}$ α-olefin copolymer include ethylene/propylene copolymer, ethylene/butene copolymer, ethylene/1-hexene copolymer, and ethylene/1—octene copolymer. The ethylene/$C_3$-$C_{12}$ α-olefin copolymer can be a MDPE, LDPE, LLDPE, ULDPE, VLDPE, HDPE, and combinations thereof.

In an embodiment, the ethylene-based polymer is an ethylene/$C_4$-$C_8$ α-olefin copolymer that is an HDPE. The HDPE has one, some, or all of the following properties:
(i) a density from to 0.940 g/cc, or 0.950 g/cc to 0.955 g/cc, or 0.960 g/cc; and/or
(ii) a melt index (MI) from to 0.5 g/10 min, or 0.7 g/10 min to 1.0 g/10 min.

A nonlimiting example of a suitable HDPE is DGDA-6318 BK available from The Dow Chemical Company.

4. Compatibilizing Polymer

In an embodiment, the present composition includes a compatibilizing polymer. The compatibilizing polymer contributes to the adhesion between the barrier polymer and the ethylene-based polymer. The compatibilizing polymer is selected from a maleated polyolefin, an acrylate-based polymer, a maleated acrylate-based polymer, a zinc ionomer, an acid copolymer, an ethylene vinyl acetate polymer and any combination thereof.

In an embodiment, the compatibilizing polymer is a maleated polyolefin. A "maleated polyolefin" is a polyolefin having an anhydride moiety pendant to the molecular chain shown in Structure (3) below.

Structure (3)

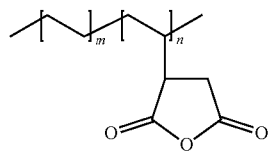

m and n each independently is from 1 to 1000.

Nonlimiting examples of suitable maleated polyolefin includes maleated polyethylene (i.e., maleated LDPE, maleated LLDPE, maleated MDPE, maleated HDPE), maleated polyolefin plastomer (POP), maleated polyolefin elastomer (POE), maleated polypropylene, maleated ethylene vinyl acetate, and any combination thereof.

In an embodiment, the compatibilizing polymer is an acrylate-based polymer. An "acrylate-based polymer" is a polymer containing an acrylate moiety as shown in Structure (4) below.

Structure (4)

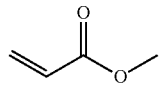

Nonlimiting examples of suitable acrylate-based polymer include poly(ethylene methacrylate) (EMA), poly(ethylene ethylacrylate) (EEA), poly(ethylene butyl acrylate) (EnBA), and any combination thereof.

In an embodiment, the compatibilizing polymer is a maleated acrylate-based polymer. A "maleated acrylate-based polymer" is a polymer containing an anhydride moiety as shown in Structure (3) and an acrylate moiety as shown in Structure (4). Nonlimiting examples of suitable maleated acrylate-based polymer include maleated poly(ethylene methacrylate) (EMA), maleated poly(ethylene ethylacrylate) (EEA), maleated poly(ethylene butyl acrylate) (EnBA), and any combination thereof.

5. Optional Additives

The present composition can include one or more optional additives. These additives include, but are not limited to, antioxidants, UV-inhibitors, slip agents (the outer layer), olfactory repellents, dyes, flame retardants (typically non-halogenated), fillers, processing agents, cure agents, and the like. Nonlimiting examples of suitable fillers include wollastonite, milled glass fiber, milled aramid fiber, milled carbon fiber, and any combination thereof.

6. Formulation

The pest repellent, the barrier polymer, the ethylene-based polymer, and the optional compatibilizing polymer can be blended simultaneously (or substantially simultaneously), or sequentially. The blending is typically performed in an extruder or a batch mixer at a temperature that will not degrade, or will minimize any degradation, of the pest repellent.

In an embodiment, the pest repellent, the barrier polymer, the ethylene-based polymer, and the optional compatibilizing polymer are blended sequentially. In a first blending step, the pest repellent is blended with the barrier polymer until a homogeneous mix, or a substantially homogeneous mix, (hereafter "repellent-barrier mix") is obtained. The repellent-barrier mix is subsequently blended with the ethylene-based polymer (and the optional compatibilizing polymer). A homogeneous blend, or a substantially homogeneous blend, forms the present composition whereby particles of the repellent-barrier mix are dispersed within the ethylene-based polymer (and along with the optional compatibilizing polymer when present).

In each blending step, the blending is performed in an extruder or in a batch mixer at a temperature that will not degrade, or will minimize any degradation, of the pest repellent. Applicant discovered that sequential blending improves leaching resistance and thereby extends the repellent efficacy of the composition.

In an embodiment, the composition includes
(i) from 0.05 wt %, or 0.1 wt %, or 0.2 wt %, or 0.25 wt % to 0.3 wt %, or 0.4 wt %, or 0.5 wt % of the pest repellent;
(ii) from 1 wt %, or 3 wt %, or 5 wt % to 7 wt %, or 9 wt %, or 10 wt % of the barrier polymer;
(iii) from 79.5 wt %, or 80 wt %, or 85 wt %, or 90 wt % to 95 wt %, or 97.95 wt % of the ethylene-based polymer; and
(iv) from 1 wt %, or 3 wt % or 5 wt % to 7 wt %, or 9 wt %, or 10 wt % compatibilizing polymer, weight percent based on total weight composition. It is understood the aggregate amount of components (i)-(iv) yield 100 wt %.

7. Irrigation Tube

The present disclosure provides an irrigation tube. An "irrigation tube" is an extruded structure having an annular wall, the annular wall defining an annular passageway. In other words, the irrigation tube is a tube through which water, or another liquid, may pass. FIG. 1A depicts an irrigation tube 10 having an annular wall 12 that defines an annular passageway 14. The annular wall 12 has an exterior surface 16 and an interior surface 18.

The annual wall 12 is composed of the present composition. In an embodiment, the annular wall 12 of the irrigation tube 10 is composed solely of the present composition. In other words, annular wall 12 is composed solely of composition having the pest repellent, the barrier polymer, the ethylene-based polymer, and the optional compatibilizing polymer as disclosed above.

Emitters 20 are arranged at intervals along the interior surface 18 of the annular wall 12. An "emitter" is an insert that controls the rate at which water or another liquid passes through an opening 22 (e.g., a hole, a slit, or a perforation) made in the annular wall by mechanical drilling, cutting or laser cutting. The emitter 20 is placed on the interior surface 18 of the annular wall 12 after the irrigation tube 10 exits the extruder while the formulation is in transition from the molten state to the rigid state, which enables the emitter 20 to adhere to the irrigation tube 10 via welding. The adherence of the emitter 20 to the annular wall 12 is sufficient to keep the emitter 20 in a fixed position, and to maintain a leak-proof seal between the annular wall 12 and the emitter 20.

The irrigation tube has a cross-sectional shape. Nonlimiting examples of suitable cross-sectional shapes for the irrigation tube include ellipse, polygon, and combinations thereof. A "polygon" is a closed-plane figure bounded by at least three sides. The polygon can be a regular polygon, or an irregular polygon having three, four, five, six, seven, eight, nine, ten or more sides. Nonlimiting examples of suitable polygonal shapes include triangle, square, rectangle, diamond, trapezoid, parallelogram, hexagon and octagon. An "ellipse" is a plane curve such that the sum of the distances of each point in its periphery from two fixed points, the foci, are equal. The ellipse has a center which is the midpoint of the line segment linking the two foci. The ellipse has a major axis (the longest diameter through the center). The minor axis is the shortest line through the center. The ellipse center is the intersection of the major axis and the minor axis. A "circle" is a specific form of ellipse, where the two focal points are in the same place (at the circle's center). Nonlimiting examples of ellipse shapes include circle, oval, and ovoid. FIG. 1 depicts an irrigation tube 10 having a circle cross-sectional shape.

In an embodiment, the annular wall 12 has a thickness, T, from 100.0 μm (3.9 mil), or 101.6 μm (4 mil), or 127.0 μm (5 mil), or 152.4 μm (6 mil) to 165.1 μm (6.5 mil), or 177.8 μm (7 mil), or 203.2 μm (8 mil), or 228.6 μm (9 mil), or 254.0 μm (10 mil), or 508.0 μm (20 mil), or 762.0 μm (30 mil), or 1016 μm (40 mil), or 1270 μm (50 mil), or 2540 μm (100 mil). The annular wall having a thickness, T, from 100 μm to 2540 μm advantageously requires a lower amount of the present composition to be used relative to irrigation tubes having an annular wall with a thickness greater than 2540 μm.

In an embodiment, the irrigation tube 10 has a burst pressure greater than 0.31 MPa, as measured on an irrigation tube having an annular wall thickness of 6 mil (152.4 μm). In another embodiment, the irrigation tube has a burst pressure from 0.31 MPa, or 0.32 MPa, or 0.33 MPa to 0.34 MPa, or 0.35 MPa, or 0.38 MPa, or 0.40 MPa, or 0.50 MPa, measured on an irrigation tube having an annular wall thickness of 6 mil (152.4 μm).

In an embodiment, the irrigation tube has an internal diameter from 10 mm, or 11 mm, or 12 mm, or 13 mm, or 14 mm, or 15 mm, or 16 mm to 17 mm, or 18 mm, or 19 mm, or 20 mm, or 25 mm.

In an embodiment, the tensile stress at yield of the irrigation tube is from 19 MPa, or 20 MPa to 22 MPa, or 23 MPa, or 25 MPa, or 30 MPa.

In an embodiment, the irrigation tube has one, some, or all of the following properties:
(a) an annular wall thickness from 100.0 μm (3.9 mil), or 101.6 μm (4 mil), or 127.0 μm (5 mil), or 152.4 μm (6 mil) to 165.1 μm (6.5 mil), or 177.8 μm (7 mil), or 203.2 μm (8 mil), or 228.6 μm (9 mil), or 254.0 μm (10 mil), or 508.0 μm (20 mil), or 762.0 μm (30 mil), or 1016 μm (40 mil), or 1270 μm (50 mil), or 2540 μm (100 mil); and/or
(b) an internal diameter from 10 mm, or 11 mm, or 12 mm, or 13 mm, or 14 mm, or 15 mm, or 16 mm to 17 mm, or 18 mm, or 19 mm, or 20 mm, or 25 mm; and/or
(c) a burst pressure from 0.31 MPa, or 0.32 MPa, or 0.33 MPa, or 0.34 MPa to 0.35 MPa, or 0.38 MPa, or 0.40 MPa, or 0.50 MPa, measured on an irrigation tube having an annular wall thickness of 6 mil (152.4 μm); and/or
(d) a tensile stress at yield from 19 MPa, or 20 MPa to 22 MPa, or 23 MPa, or 25 MPa, or 30 MPa, measured on an irrigation tube having an annular wall thickness of 6 mil (152.4 μm); and/or
(e) a tensile load at yield from 160 N, or 165 N, or 167 N to 225 N, or 230 N, or 250 N, or 260 N, measured on an irrigation tube having an annular wall thickness of 6 mil (152.4 μm).

The present irrigation tube is suitable for agricultural drip irrigation systems, including those used in farming, public gardens, private gardens, and golf courses.

The irrigation tube may comprise two or more embodiments discussed herein.

8. Multilayer Irrigation Tube

In an embodiment, a multilayer irrigation tube is provided. Figure B shows multilayer irrigation tube 110. Multilayer irrigation tube 110 has an annular wall 112 that defines an annular passageway 114. The annular wall 112 has an exterior surface 116 and an interior surface 118. Emitters 120 are arranged at spaced-apart intervals along the interior surface 118. Each emitter 120 includes one or more openings 122 for discharging water. emitter 120 is the same as, or substantially the same as emitter 20 of FIG. 1A.

Figure 1B:
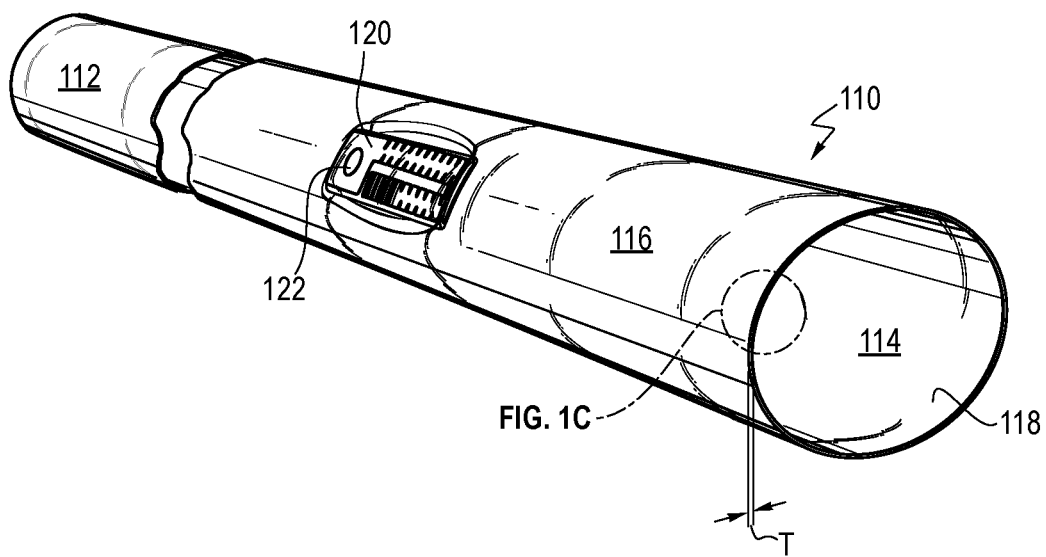
FIG. 1B is a perspective view of a multilayer irrigation tube in accordance with an embodiment of the present disclosure.
Figure 1C:
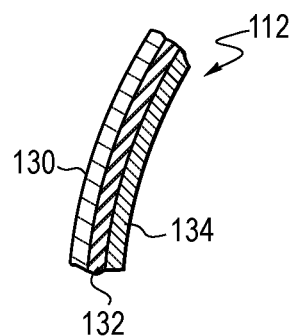
FIG. 1C is an enlarged perspective view of Area 1C from FIG. 1B.

The annual wall 112 has a multilayer structure. FIG. 1C is an enlarged perspective view of an end of the multilayer irrigation tube 110, FIG. 1C showing the multilayer structure of the annular wall 112. Annular wall 112 includes an outer layer 130, an intermediate layer 132, and an inner layer 134.

The outer layer 130 is composed of a blend of the pest repellent and the ethylene-based polymer. The pest repellent can be any pest repellent as disclosed above. The ethylene-based polymer can be any ethylene-based polymer as disclosed above. In the formation of the outer layer, the pest repellent is blended with one or more ethylene-based polymer(s)(and optional fillers) to form a homogeneous blend. The blending is typically done in the extruder or batch mixer from which the outer layer is formed, and it is conducted at a temperature that will not degrade, or at least will minimize any degradation, of the pest repellent.

In an embodiment, the outer layer 130 is the outermost layer for the multilayer irrigation tube 110.

In an embodiment, the outer layer 130 is composed of from 0.05 wt % to 0.5 wt % gustatory pest repellent and from 99.5 to 99.95 wt % HDPE (and/or MDPE). Weight percent is based on total weight of the outer layer. The outer layer has one, some, or all of the following properties:
  (i) a strain at break (%) of greater than 9%; and/or
  (ii) a melt index (I2) from 0.1 dg/min, or 0.5 dg/min, or 1.0 dg/min, or 1.5 dg/min to 2.0 dg/min, or 2.5 dg/min, or 3.0 dg/min; and/or
  (iii) a Young's Modulus from 20,000 psi, or 50,000 psi, or 75,000 psi, or 100,000 psi to 150,000 psi, or 200,000 psi.

The intermediate layer 132 is composed of the compatibilizing polymer. The compatibilizing polymer can be any compatibilizing polymer selected from a maleated polyolefin and an acrylate-based polymer as disclosed above.

In an embodiment, the intermediate layer 132 is free of, or is otherwise void of, the pest repellent.

The inner layer 134 is composed of the barrier polymer. The barrier polymer can be any polyamide and/or polyester having a melt temperature from 175° C. to less than 230° C. and as disclosed above.

In an embodiment, the inner layer 134 is free of, or is otherwise void of, the pest repellent.

In an embodiment, the inner layer 134 is the innermost layer of the multilayer irrigation tube 110.

In an embodiment, the multilayer irrigation tube 110 has the following layer construction, in terms of volume percent (%), based on total volume of the annular wall 112:
  (i) outer layer 130 has a volume % from 70% to 83%;
  (ii) intermediate layer 132 has a volume % from 2% to 5%; and
  (iii) inner layer 134 has a volume % from 15% to 25%.

By way of example, and not limitation, some embodiments of the present disclosure will now be described in detail in the following Examples.

EXAMPLES

TABLE 1 below provides a list of the materials used in the Examples.

| Material/Description | Material Type | I2 (dg/min)² | Density (g/cc) | Tm °C. | Graft level | Source |
|---|---|---|---|---|---|---|
| Pest repellent | | | | | | |
| REPELA ™ for Rodents | Denatonium benzoate[1] | NA | NA | | NA | Aversion Technologies |
| Denatonium | C21H29N2O • C7H5O2 | NA | NA | | NA | Sigma-Aldrich |
| Barrier polymer | | | | | | |
| CRASTIN 6134 | Polybutylene terephthalate (PBT) | 32.0 | 1.30 | 226 | NA | DuPont Performance Polymers |
| AE7270A MYLAR | Polyethylene Terephthalate (PET) | NA | NA | 254 | NA | DuPont Teijin U.S. |
| AE7270B PBT | Polybutylene Terephthalate (PBT) | NA | NA | 223 | NA | DuPont Teijin U.S. |
| AEGIS H55WC-LP | Nylon 6 | NA | 1.15 | 220 | NA | Honeywell AdvanSix |
| ESTAR ™ PP001 Amorphous CoPolyester | Amorphous CoPolyester (CoPET) | NA | 1.27 | 222 | NA | Eastman |
| Grilamid ® L 20 nat | Nylon 12 | NA | 1.01 | 178 | NA | EMS-Grivory |
| Ethylene-based polymer | | | | | | |
| DGDA6318-BK (HDPE) | Ethylene/1-hexene copolymer (HDPE) | 0.75 | 0.955 | | NA | The Dow Chemical Company |
| DMDA-6400 NT7 | Ethylene homopolymer (HDPE) | 0.80 | 0.961 | 133 | NA | The Dow Chemical Company |

TABLE 1-continued below provides a list of the materials used in the Examples.

| Material/Description | Material Type | I2 (dg/min)[2] | Density (g/cc) | Tm °C. | Graft level | Source |
|---|---|---|---|---|---|---|
| Compatibilizing polymer | | | | | | |
| AMPLIFY GR216 | MAH functional polymer | 1.3 | 0.875 | 62.8 | High (Range 0.5-1.0 Wt %) | The Dow Chemical Company |
| AMPLIFY TY1053H | (MAH) functional polymer | 2.0 | 0.958 | 130 | Very High (>1.0 Wt %) | The Dow Chemical Company |
| Filler | | | | | | |
| VANSIL ™ W40 wollastonite | Calcium metasilicate mineral | NA | 2.90 | | NA | RT Vanderbilt |

[1] EVA based masterbatch with Denatonium benzoate aversives (5% DB in 95% EVA (Tm~87 C.))
[2] Melt Mass Flow Rate
NA—not applicable A. Incorporation of Denatonium Benzoate into Plastic Substrates as Controls REPELA for Rodents into DGDA-6318BK. REPELA™ for Rodents (6.15 grams (g)) is a masterbatch of powerful aversives of 5% denatonium benzoate in ethylene-vinyl acetate copolymer ($T_m$ 87° C.) for deterring animals and is available from Aversion Technologies, and DGDA-6318 BK high density polyethylene (198.85 g) (HDPE, melt index (I2) of 0.70 grams per 10 minutes (g/10 min) at 190° C./2.16 kg (ASTM D1238) and a density of 0.954 grams per cubic centimeter (g/cc) (ASTM D792)) black available from The Dow Chemical Company) are dried mixed together overnight in a 70° C. in a vacuum oven. The polymers are added to a 190° C. HAAKE™ Rheomix 3000p with roller rotors at 10 revolutions per minute (rpm) with mixing for 1 minute. The roller speed is then increased stepwise over 2 minutes to 60 rpm with material fluxed for 6.5 minutes at 60 rpm and then removed from the mixer and pressed into sheets while still hot. For physical testing, material is cut into small pieces and dried in vacuum oven overnight at 70° C. prior to molding into plaques. On a Carver press plaques are molded at 200° ° C. with 3 minutes at 21 MPa, 3 minutes at 69 MPa, and 1 minute at 138 MPa with plaques cooled under pressure using water cooled platens. For tensile bars, a 5"×5"×0.072" chase is used for compression molding with microtensile bars stamped out. Tensile testing is performed according to ASTM D1708 with microtensile bars at rate of 2 inches/minute. Notched Izod test specimens are molded in similar fashion using a chase about 0.125" thick. Notched Izod are performed according to ASTM D256 at 23° C. Melt index (I2) is measured grams per 10 minutes (g/10 min) at 190° C./2.16 kg (ASTM D1238).

Denatonium Benzoate into DGDA-6318BK/AMPLIFY TY1053H/Nylon 6. Dry Nylon 6 AEGIS H55WC-LP (24.21 g), a medium viscosity, heat stabilized Nylon 6, Tm 220° C. wire jacketing resin available from AdvanSix, is rolled in a jar at room temperature)(23° ° C. with a solution of denatonium benzoate (0.3075 g) from TCI America and deionized water (0.95 g) for 6 hours, and then DGDA-6318 HDPE (176.69 g) is added to the jar and rolled overnight (12 hours). The rolled mixture is then dried overnight in a 70° C. in a vacuum oven. AMPLIFY™ TY1053H from Dow Chemical (4.10 grams) is added to the rolled, dried mixture just before mixing in the HAAKE™ mixer. The polymers are added to a 232.5° C. HAAKE™ Rheomix 3000p with roller rotors at 10 rpm with mixing for 1 minute. The roller speed is then increased stepwise over 2 minutes to 60 rpm with material fluxed for 6.5 minutes at 60 rpm and then removed from mixer and pressed into sheet while still hot.

Denatonium Benzoate into Nylon 6. Dry Nylon 6 AEGIS H55WC-LP (205 g), a medium viscosity, heat stabilized Nylon 6, Tm 220° C. wire jacketing resin available from AdvanSix, is rolled in a jar at room temperature (23° C.) with a solution of denatonium benzoate (0.3075 g) from TCI America and deionized water (1.80 g) overnight (12 hours). The rolled mixture is dried overnight in a 70° C. vacuum oven. The polymers are added to a 232.5° C. HAAKE™ Rheomix 3000p with roller rotors at 10 rpm with mixing for 1 minute. The speed is then increased stepwise over 2 minutes to 60 rpm with material fluxed for 6.5 minutes at 60 rpm and then removed from mixer and pressed into sheet while still hot.

Denatonium Benzoate into UNIVAL DMDA-6400 NT7 with Wollastonite and AMPLIFY™ TY1053H. Denatonium benzoate (0.338 g) and the wollastonite VANSIL™ W40 from RT Vanderbilt (45.00 g) are dry mixed in a jar on rollers for 2 hours then dried overnight (12 hours) in a 70° ° C. vacuum oven. AMPLIFY™ TY1053H (3.60 g available from The Dow Chemical Company) is a maleic anhydride grafted HDPE with a density of 0.958 g/cc and an I2 of 2.0 g/10 min, and UNIVAL™ DMDA-6400 NT-7 is a multi-purpose HDPE homopolymer (176.40 g available from The Dow Chemical Company) with a density of 0.961 g/cc and an I2 of 0.80 g/10 min are dry mixed together and dried overnight (12 hours) in a 70° ° C. vacuum oven. The polymers are added to a 190° C. HAAKE™ Rheomix 3000p with roller rotors at 10 rpm with mixing for 1 minute. The speed is then increased stepwise over 2 minutes to 60 rpm, fluxed for 2 minutes with speed slowed to 30 rpm with wollastonite/denatonium benzoate mixture added over 4 minutes. The speed is then increased to 60 rpm and material fluxed for 5 minutes at 60 rpm, and then removed from mixer and pressed into sheet while still hot. For physical testing, material is cut into small pieces and dried in vacuum oven overnight at 70° C. prior to molding into plaques. On a Carver press plaques are molded at 200° C. with 3 minutes at 21 MPa, 3 minutes at 69 MPa, and 1 minute at 138 MPa with plaques cooled under pressure using water cooled platens. For tensile bars, a 5"×5"×0.072" chase is used for compression molding with microtensile bars stamped out. Tensile testing is performed according to ASTM D1708 with microtensile bars at rate of 2 inches/minute. Notched Izod test specimens are molded in similar fashion using a chase about 0.125" thick. Notched Izod are performed according to ASTM D256 at 23° C. Melt index (I2) is measured grams per 10 minutes (g/10 min) at 190° C./2.16 kg (ASTM D1238).

Leaching Studies. The above materials containing denatonium benzoate are cut into small pieces and re-dried overnight (12 hours) in a 70° C. vacuum oven. The dried material are molded in a 6 inch by 6 inch chase that is 2 mm thick on a CARVER™ press with pressure applied for 3 minutes at 21 MPa, 3 minutes at 69 MPa, and 1 minute at 138 MPa and cooled between water cooled platens. For the REPELA™/DGDA-6318 and Denatonium Benzoate/VAN-SIL™ W40/AMPLIFY™ TY1053H/DMDA-6400 NT7 material the CARVER™ press is set at 200° ° C. For denatonium benzoate/DGDA-6318-BK/Nylon 6 material and the denatonium benzoate/Nylon 6 materials the press is set at 255° C. From these molded plaques are cut 0.5 inch wide and 2.0 inch long coupons for the leaching studies.

B. Measurements of Leaching of Denatonium Benzoate During Water Submersion

Figure 2:
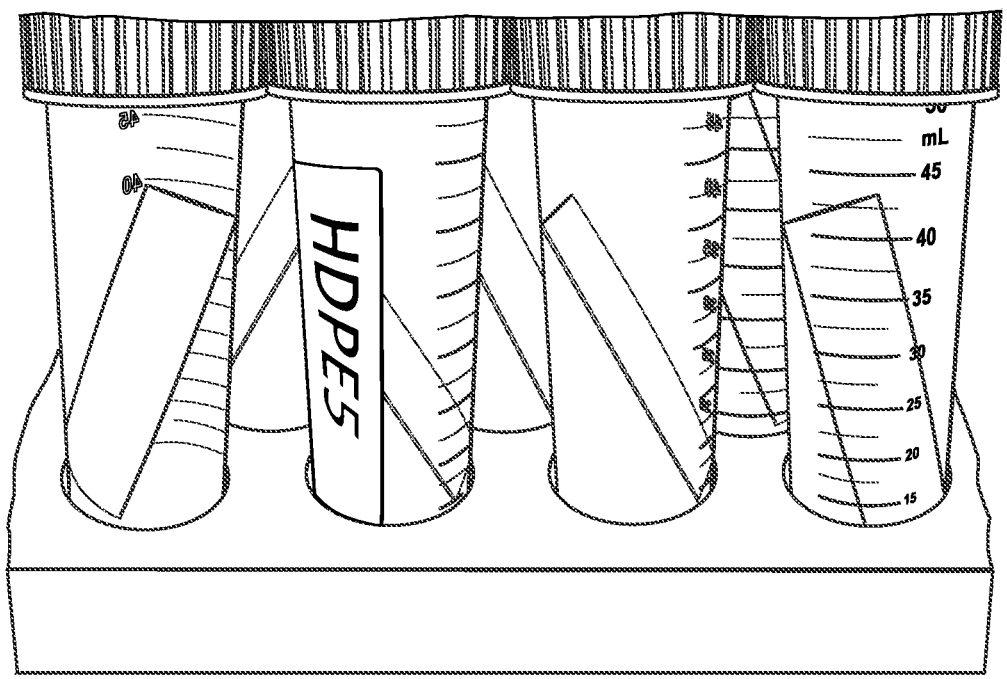
FIG. 2 is an image showing denatonium-doped polymer coupons during incubation in centrifuge tubes.
Figure 3A:
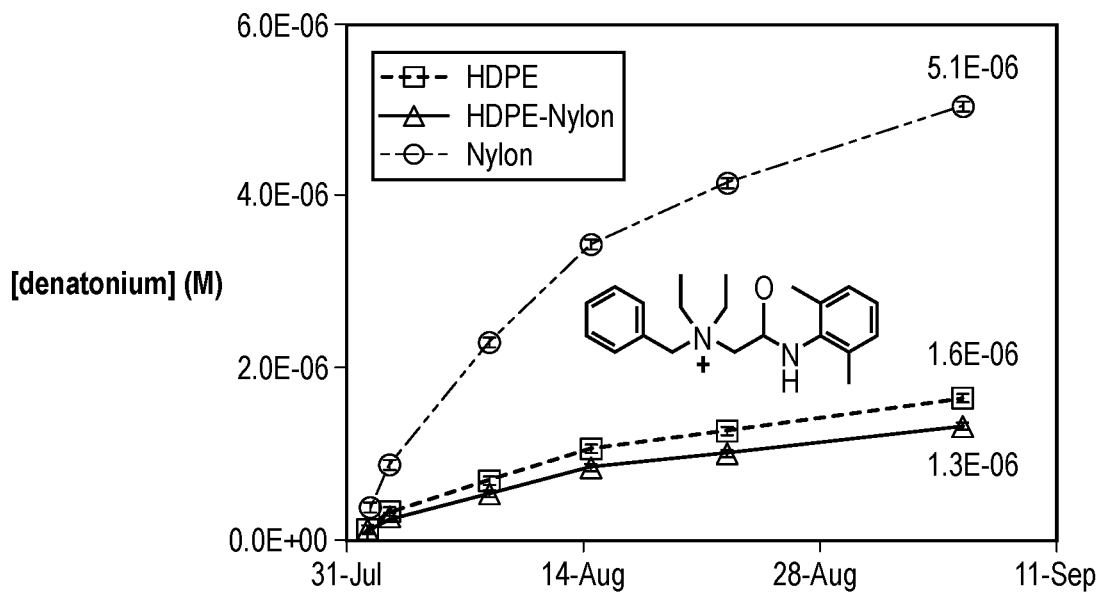
FIGS. 3A and 3B are graphs showing a comparison of observed leaching from HDPE, HDPE/Nylon, and Nylon.
Figure 3B:
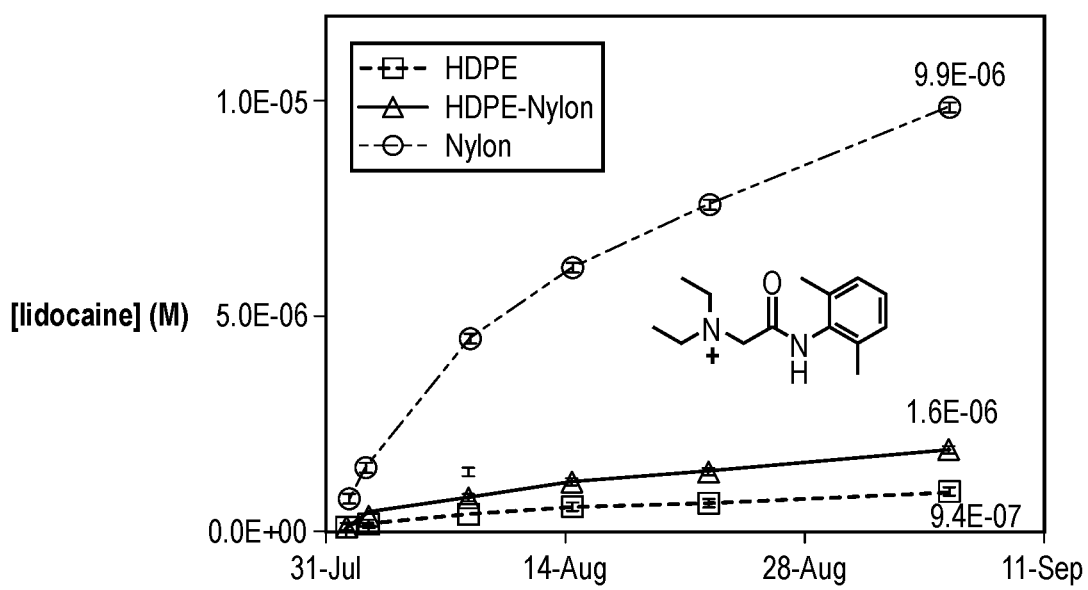
Figure 4:
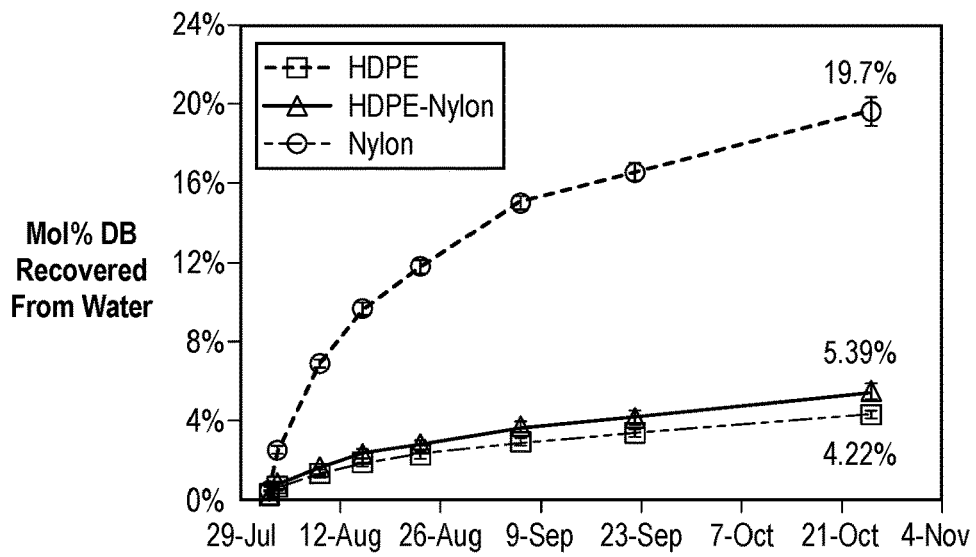
FIG. 4 is a graph showing denatonium benzoate leachate as combined denatonium benzoate and lidocaine.
Figure 5:
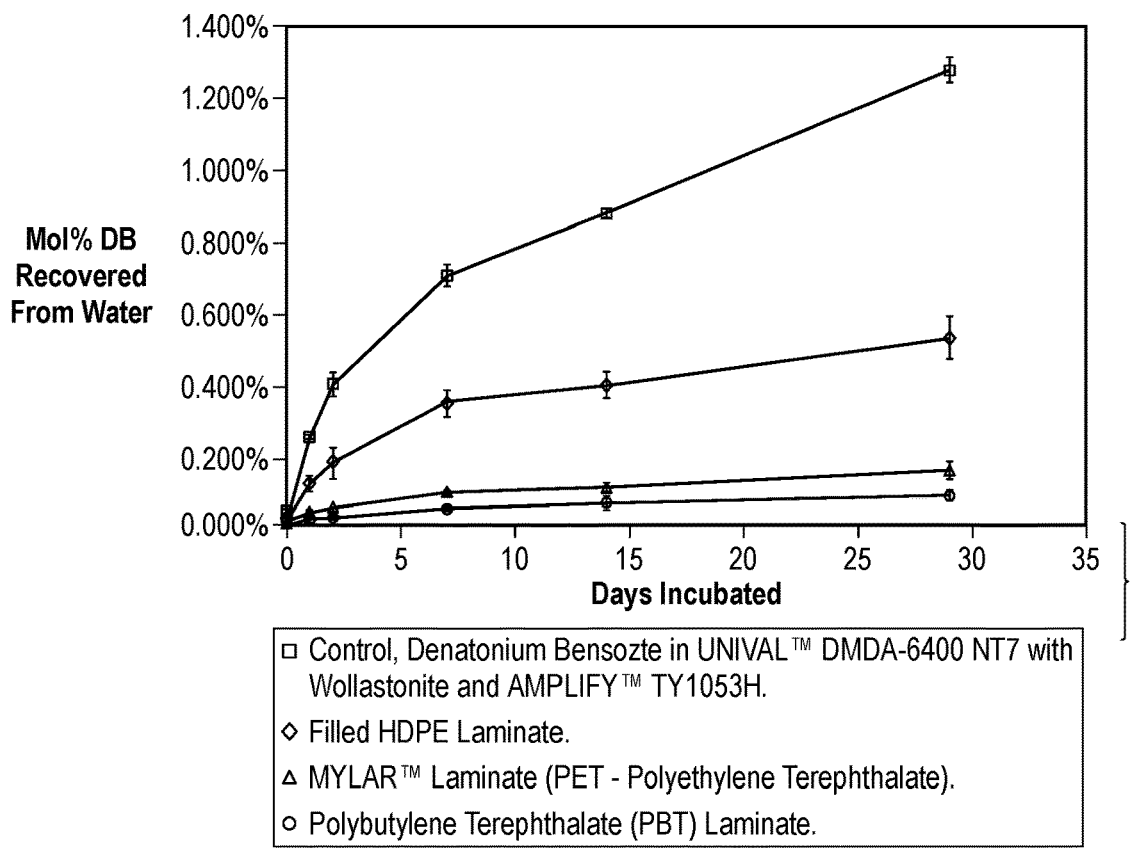
FIG. 5 is a graph showing denatonium benzoate leachate as combined denatonium benzoate and lidocaine from control and laminates.

Six coupons each for control conditions in FIGS. 2A-2B and 3 and two laminate coupons for each inventive composition and control in FIG. 4 tested are weighed into clean polypropylene 50 milliliter (mL) centrifuge tubes. Approximately 40 g of ultrapure water are weighed in with the coupons. The coupons are incubated at room temperatures (23° C.) and small aliquots are withdrawn periodically to determine the concentrations of denatonium and its breakdown product, lidocaine in solution (FIG. 2). This allows determining the absolute and relative leaching rates from coupons made from HDPE, HDPE with added NYLON, or pure NYLON (FIGS. 3A-B and 4) or from laminated versus not-laminated HDPE coupons (FIG. 5). The sum of the measured amount (moles) of denatonium and lidocaine in the solutions is subtracted from the total moles of denatonium benzoate initially present in the coupons to calculate the percentage of denatonium that escapes and that can be measured in the water (FIG. 4).

At each time point, 100 microliters (μL) are withdrawn from the incubations. The removed aliquot is combined with 100 μL of 0.2% aqueous formic acid in a polypropylene high-performance liquid chromatography (HPLC) vial and the resulting solution is analyzed by the HPLC mass spectrometry (HPLC-MS) procedure described below.

Standards for the quantitation of the leachate ranging from 10 parts per million (ppm) to 5 parts per billion (ppb) are prepared from denatonium benzoate and lidocaine hydrochloride standard materials by accurately weighing approximately 100 mg of the materials into a polypropylene bottle and accurately adding water to a total weight of approximately 100 grams followed by serial dilution in 0.2% formic acid in polypropylene centrifuge tubes to afford concentrations over the complete desired range. It is necessary to acidify all sample solutions and to use plastic containers to avoid loss of the analytes. In addition to these standards, quality control samples are prepared separately from the solid standards periodically at levels between 10 ppb and 1 ppm to verify the accuracy of the method. Recovery is determined to be 97% at the 1 ppm level by a spike recovery experiment.

The denatonium and lidocaine cations are measured in selective ion monitoring mode (SIM) by a Q-EXACTIVE™ mass spectrometer (Thermo Scientific, San Jose) at 325.228 Th (denatonium) and 235.181 Th (lidocaine). Note that the use of a high resolution ORBITRAP™ mass spectrometer affords additional selectivity over a traditional unit resolution mass selective detector by excluding isobaric interferences of the same nominal mass. Quantification proceeded by comparing the integrated peak areas from 235.1782-235.1830 Th for lidocaine and 325.2246-325.2312 Th for denatonium against a standard curve prepared from the standards prepared by the procedure described in the previous paragraph. The standard curves are built from duplicate injections of at least 4 standards over a concentration range that brackets the concentrations of the analytes in the leachate samples. Standards are injected before and after sample injections to insure against instrumental drift.

Of all samples, standards, blanks, and quality control samples, 1 μl is injected onto the HPLC-MS system, which consisted of a DIONEX™ 300 LC coupled to the Q-EXACTIVE™ mass spectrometer. The analytes are separated from each other and matrix peaks by gradient elution from a reverse phase HPLC column (Agilent InfinityLab Poroshell 120 EC-C18, 50 mm×3 mm×2.7 μm) at a flow rate of 0.8 mL/min and 35° C. Mobile phase A consisted of water with 1 g/L ammonium formate and 1 mL/L formic acid (pH=3.5) and mobile phase B is acetonitrile. The gradient program is as follows: 10% B for 0.5 min, to 95% B at 5 min, hold until—6 min, return to 10% B at 6.5 min- and hold to 9 min. The retention time of lidocaine is sensitive to mobile phase pH. In contrast, the retention time of denatonium is practically independent of buffer pH since the molecule bears a permanent positive charge, being a tertiary amine.

The column effluent is ionized using positive mode electrospray ionization (ESI) with the following parameters: 4 kilovolt (kV) spray voltage, 60 units sheath gas, 20 units auxiliary gas, 300° C. probe temperature, 320° C. inlet capillary temperature, S-lens setting of 50 units. Mass analysis is conducted with the following parameters, which were found to yield the most linear calibration curves over the widest range of concentrations, while giving a sufficient number of points across the peaks for quantitation:

The mass spectrometer acquisition parameters are: 35,000 resolution (FWHM at 200 Th), 50,000 charges AGC target, 200 ms maximum injection time, 4 Th isolation window around the molecular ions at 325.228 and 235.181 Th, centroid data acquisition. Data for lidocaine is collected from 1.75 to 2.75 min around its retention time of 2.28 min and data for denatonium is collected from 2.75 to 4 min around its retention time of 3.43 min.

Note that it may be advantageous to vary the injection volume or the mass spectrometer AGC target setting to achieve the required sensitivity at very low concentrations of the analytes, as may be the case in the early stages of leaching from laminated coupons. Adjustments may also be indicated to achieve good linearity at high concentrations of the analytes, as may be measured after several weeks leaching from unprotected coupons.

C. Fabrication of Laminates with Higher Hardness, Filled HDPE-Inventive Examples The laminates are prepared by first taking the Denatonium Benzoate into DMDA-6400 NT7 with Wollastonite and AMPLIFY™ TY1053H utilized in the control and drying overnight in a 70° C. vacuum oven. A thin film of AMPLIFY™ GR216 to be used for laminate is pressed at 200° C. between sheets of aluminum 0.38 mm thick and cooled to room temperature. Thin films of polybutylene terephthalate (PBT) used for the laminates are prepared by utilizing a chase 6"×6" and 0.125 mm thick and compression molding 6 grams of PBT (dried overnight in 70° C. vacuum oven) between aluminum 0.38 mm thick on a 250° C. CARVER™ press with 2 minutes at 21 MPa and 2 minutes at 69 MPa with cooling between room temperature metal plates with PBT film removed from chase. Thin films of DMDA 6400 NT7/AMPLIFY™ TY1053H/wollastonite (78.4/1.6/20, w/w/w) used for the laminates are prepared by utilizing a chase 6"×6" and 0.125 mm thick and compression molding 5 g of filled HDPE (dried overnight in 70° C. vacuum oven) between aluminum 0.38 mm thick on a 200° C. CARVER™ press with 2 minutes at 21 MPa and 2 minutes at 69 MPa psi with cooling between room temperature metal plates and film is left in the chase.

D. MYLAR™ Laminate (PET—Polyethylene Terephthalate)

The laminate is prepared by taking MYLAR™ film (0.125 mm thick) and placing the thin film of AMPLIFY™ GR216 on top of it, then placing the 6 inch by 6 inch chase that is 2 mm thick on top of the AMPLIFY™ GR216 with the chase is filled with same mass of denatonium benzoate in DMDA-6400 NT7 with wollastonite and AMPLIFY™ TY1053H utilized in the control with a thin film of AMPLIFY™ GR216 placed on top of the chase containing denatonium benzoate in DMDA-6400 NT7 with wollastonite and AMPLIFY™ TY1053H and another piece of MYLAR™ film placed on top of it. This assembly between aluminum sheet 0.38 mm thick is placed on a 200° C. CARVER™ press with pressure applied for 3 minutes at 21 MPa, 3 minutes at 69 MPa, and 1 minute at 138 MPa psi and cooled between room temperature metal plates. From this molded laminate is cut 0.5 inch wide and 2.0 inch long coupons for the leaching studies.

E. Polybutylene Terephthalate (PBT) Laminate

The laminate is prepared by taking the prepared PBT film and placing the thin film of AMPLIFY™ GR216 on top of it, then placing the 6 inch by 6 inch chase that is 2 mm thick on top of the AMPLIFY™ GR216 with the chase is filled with same mass of denatonium benzoate in DMDA-6400 NT7 with Wollastonite and AMPLIFY™ TY1053H utilized in the control with a thin film of AMPLIFY™ GR216 placed on top of the chase containing denatonium benzoate in DMDA-6400 NT7 with wollastonite and AMPLIFY™ TY1053H and another piece of the prepared PBT film placed on top of it. This assembly between aluminum sheet 0.38 mm thick is placed on a 200° C. CARVER™ press with pressure applied for 3 minutes at 21 MPa, 3 minutes at 69 MPa, and 1 minute at 138 MPa and cooled room temperature metal plates. From this molded laminate is cut 0.5 inch wide and 2.0 inch long coupons for the leaching studies.

F. Filled HDPE Laminate

A laminate component is prepared by molding in the 6 inch by 6 inch chase that is 2 mm thick and filling with same mass of denatonium benzoate in DMDA-6400 NT7 with wollastonite and AMPLIFY™ TY1053H utilized in the control between aluminum sheet 0.38 mm thick and molding on a 200° ° C. CARVER™ press with 2 minutes at 21 MPa and 2 minutes at 69 MPa and cooled between room temperature metal plates and left in the chase. For the laminate, on the aluminum sheet 0.38 mm thick is first placed the thin film of DMDA 6400 NT7/AMPLIFY™ TY1053H/wollastonite (78.4/1.6/20, w/w/w) in the 0.125 mm chase with the denatonium benzoate in DMDA-6400 NT7 with wollastonite and AMPLIFY™ TY1053H in the 2 mm thick chase placed on top of it with another thin film of DMDA 6400 NT7/AMPLIFY™ TY1053H/wollastonite (78.4/1.6/20, w/w/w) in the 0.125 mm chase placed on top of it with aluminum sheet 0.38 mm thick placed on top to complete the assembly. This assembly is placed on a 200° C. CARVER™ press with pressure applied for 1.5 minutes at 21 MPa and 1.5 minute at 69 MPa and cooled between room temperature (23° C.) metal plates. From this molded laminate is cut 0.5 inch wide and 2.0 inch long coupons for the leaching studies.

Denatonium benzoate leaching results for the laminates and control of wollastonite filled HDPE of DMDA 6400 NT7 with denatonium benzoate are summarized in FIG. 5 with experiment run and measured as previously described for the unfilled Control samples.

G. Incorporation of Fillers into HDPE Plastic Substrates for Higher Hardness—UNIVAL™ DMDA 6400 NT7/AMPLIFY™ TY1053H/Wollastonite (78.4/1.6/20, w/w/w)

UNIVAL™ DMDA-6400 NT-7 HDPE from Dow Chemical (176.40 grams) and AMPLIFY™ 1053H from Dow Chemical (3.60 grams) pellets are dry blended in one jar and wollastonite VANSIL™ W40 from RT Vanderbilt filler (45.00 grams) is placed in another jar with both dried overnight in 70° C. vacuum oven. The polymers are added to a 190° C. HAAKE™ Rheomix 3000p with roller rotors at 10 rpm for 1 minute with speed increased stepwise to 60 rpm over 2 minutes; speed is reduced to 30 rpm with filler added over 3 to 4 minutes with speed increased to 60 rpm and materials fluxed for 5 minutes then removed from mixer and pressed into sheet while hot.

For physical testing of unfilled polymer controls, pellets are dried overnight in a 70° C. vacuum oven. The dried materials are molded on a 200° ° C. CARVER™ press for polyethylene based materials and at 255° C. for Nylon 6 based materials with pressure applied for 3 minutes at 21 MPa, 3 minutes at 69 MPa, and 1 minute at 138 MPA and cooled on between water cooled platens. For tensile bars, a 5"×5"×0.072" chase is used for compression molding with microtensile bars stamped out. Tensile testing is performed according to ASTM D1708 with microtensile bars at rate of 2 inches/minute. Notched Izod test specimens are molded in similar fashion using a chase about 0.125" thick. Notched Izod are performed according to ASTM D256 at 23° C. Melt index (I2) is measured grams per 10 minutes (g/10 min) at 190° C./2.16 kg (ASTM D1238).

Some leach reduction properties are provided in Table 2 below.

TABLE 2

| | Repellent Denatonium Benzoate(DB) | HDPE | Nylon | Process, ° C. | Press, ° C. | Mol % Combined DB & Lidocaine Leached After 90 days |
|---|---|---|---|---|---|---|
| CS1 | 0.3075 g DB (by way of 6.15 g Repela) | 198.85 g DGDA-6318BK | — | 190 | 200 | 4.22 |
| CS2 | 0.3075 g DB | 176.69 g DGDA-6318 | 24.21 g AEGIS H55WC-LP | 232.5 | 255 | 5.39 |
| CS3 | 0.3075 g DB | — | 205 g AEGIS H55WC-LP | 232.5 | 255 | 19.7 |

TABLE 2-continued

|  | Repellent Denatonium Benzoate(DB) | HDPE | Nylon | Process, ° C. | Press, ° C. | Mol % Combined DB & Lidocaine Leached After 90 days |
|---|---|---|---|---|---|---|
| CS4 | 0.338 g DB | 176.4 g DMDA-6400 45 g Wollastonite 3.6 g AMPLIFY TY1053H | — | 190 | 200 | — |

DB is known to be soluble in water. Comparative samples 1-3 (CS1-3) show that the leach reduction (the lower the mol % DB/Lidocaine, the better) of the DB active species is greater for HDPE (4.22) alone than the leach reduction for nylon 6 alone (19.7). Blending DB into nylon 6 and HDPE has better leach reduction (5.39) than nylon 6 alone (19.7). However, nylon 6/HDPE blend leach reduction (5.39) is less than HDPE alone for leach reduction (4.22). This is not surprising as the nylon has much greater affinity for water than polyethylene and therefore could allow greater leaching. The data for CS3 shows nylon 6 alone is not a barrier to prevent leaching. Table 2 demonstrates that not all barrier polymers are the same in leach reduction capability.

or copolyester (such as PETG for example) serves as the inner layer, the inner layer exposed to water in irrigation tube.

Applicant found that the pest repellent extracts readily when the pest repellent is blended into the ethylene-based polymer, the polyamide, or the co-polyester. However, Applicant discovered blending the pest repellent first into the barrier polymer, to form the repellent-barrier mix, and then subsequently blending the repellent-barrier mix into ethylene-based polymer unexpectedly reduces repellent leaching.

TABLE 3 multilayer films

|  | Inner layer | Tie layer | Core | Tie layer | Outer layer | Press, ° C. | Mol % Combined DB & Lidocaine Leached After 14 days | Mol % Combined DB & Lidocaine Leached After 30 days | Mol % Combined DB & Lidocaine Leached After 65 days |
|---|---|---|---|---|---|---|---|---|---|
| CS5 | none | none | CS1 blend chase | none | none | 200 | 1.79 |  | 3.75 |
| CS6 | none | none | CS4 blend chase | none | none | 200 |  | 1.3 |  |
| CS7 | CS4 blend film | none | CS4 blend chase | none | CS4 blend film | 200 |  | 0.45 |  |
| IE8 | MYLAR film | GR216 film | CS4 blend chase | GR216 film | MYLAR film | 200 | 0.037 | 0.05 | 0.05 |
| IE9 | PBT film | GR216 film | CS4 blend chase | GR216 film | PBT film | 200 |  | 0.025 |  |

For controls CS5 and CS6, CS5 has lower density and hence lower crystal content than CS6 so CS5 has lower barrier properties.

Surprisingly, layers with hygroscopic materials surrounding the HDPE, as in inventive examples 8-9 (IE 8-9), show that an outer layer of barrier polymer can provide leach reduction even if the barrier polymer is hygroscopic (PET, PBT, nylon) compared to non-hygroscopic resins (polyethylene, polypropylene).

Surprisingly, the hygroscopic barrier polymer PET reduces leach better than the non-hygroscopic resin, HDPE, as indicated by IE8 &IE9 improved leach reduction compared to CS7. This is surprising because greater leaching would be more expected with higher water permeation than the core material containing the DB.

Inventive examples 8 and 9 (IE8 and IE9) show improved leach reduction for multilayer structures where the polyester H. Production of Irrigation Tubes Irrigation tubes having the structure of irrigation tubes 10/110 as shown in FIGS. 1A-1C are formed from the formulations of Table 2 using a Maillefer™ Extruder MXC 60-36D or the like with a diameter of 60 mm and a length/diameter (L/D) ratio of 36. The extruder uses a suitable temperature profile to achieve a melt temperature of 240° C. The extruder is equipped with an annular die having a 34.5 mm diameter and a pin having a 32.5 mm diameter (gap of 1 mm). Each irrigation tube 10 has an internal diameter of 16 mm. Thickness of the annular wall 12 is adjusted by changing the rotations per minute (rpm) of the extruder, and the line speed of the extruder. Then, each irrigation tube 10 is calibrated and water cooled. During cooling of the tube, just after exiting the extruder, emitters (with shape/structure of emitter 20 in FIG. 1A) are placed on the interior surface of the annular wall. Down the line, perforations in the annular wall at the emitters are made online before winding the tube by a mechanical drilling device or laser cut.

It is specifically intended that the present disclosure not be limited to the embodiments and illustrations contained herein, but include modified forms of those embodiments including portions of the embodiments and combinations of elements of different embodiments as come within the scope of the following claims.

What is claimed is:

1. An irrigation tube comprising:
    an annular wall formed from a composition comprising a pest repellent;
    a barrier polymer having a melt temperature, Tm, from 175° C. to less than 270° C., the barrier polymer selected from the group consisting of one or more polyamides, one or more polyesters, and combinations thereof;
    an ethylene-based polymer, and
    wherein the pest repellent is mixed into the barrier polymer to form a repellent-barrier mix; and
    particles of the repellent-barrier mix are dispersed within the ethylene-based polymer.

2. The irrigation tube of claim 1 wherein the pest repellent is a gustatory repellent.

3. The irrigation tube of claim 2 wherein the pest repellent is at least one of a capsaicinoid or a denatonium salt.

4. The irrigation tube of claim 1 wherein the barrier polymer is one or more polyesters.

5. The irrigation tube of claim 1 comprising a compatibilizing polymer selected from the group consisting of a maleated polyolefin, an acrylate-based polymer, a maleated acrylate-based polymer, a zinc ionomer, an acid copolymer, an ethylene vinyl acetate polymer, and combinations thereof.

6. The irrigation tube of claim 4 wherein the one or more polyesters is selected from the group consisting of polyethylene terephthalate (PET), polybutylene terephthalate (PBT), polytrimethylene terephthalate, and polyethylene napthalate, amorphous copolyester, polyethylene terephthalate glycol (PETG), and any combination thereof.

7. The irrigation tube of claim 1 wherein the composition comprises from 0.05 wt % to 0.5 wt % of the pest repellent.

8. The irrigation tube of claim 7 wherein the composition comprises from 1 wt % to 10 wt % of the barrier polymer.

9. The irrigation tube of claim 8 wherein the composition comprises from 79.5 wt % to 97.95 wt % of the ethylene-based polymer.

10. The irrigation tube of claim 9 wherein the composition comprises from 1 wt % to 10 wt % of a compatibilizing polymer.

11. The irrigation tube of claim 10 wherein the compatibilizing polymer is selected from the group consisting of a maleated polyolefin, an acrylate-based polymer, a maleated acrylate-based polymer, a zinc ionomer, an acid copolymer, an ethylene vinyl acetate polymer, and combinations thereof.

* * * * *